2,973,338

LOW VAPOR PERMEABLE COMPOSITION OF A POLYSTYRENE AND NAPHTHALENE-FORMALDEHYDE RESIN AND METHOD OF PREPARATION

Herbert A. Gottschall, 30 S. Spring Garden Ave., Nutley, N.J.

No Drawing. Filed Dec. 2, 1958, Ser. No. 777,597

4 Claims. (Cl. 260—45.5)

This invention relates to an improved plastic composition and in particular to a composition having low water vapor permeability.

This application is a continuation-in-part of my prior filed applications, entitled "Low Vapor Impervious Plastic," Serial No. 340,385, filed March 4, 1953, now abandoned, and "Low Vapor Impervious Plastic," Serial No. 602,433, filed August 6, 1956, now abandoned.

In certain applications for plastics, such as containers or casings for batteries, it is essential that the passage of water vapor through the body of the container material be minimized. The loss of water from a battery system during storage under normally dry atmospheric conditions results in poor shelf life. Shelf life of a battery is important, particularly in military applications, wherein a battery may be in storage for many years before actually being placed in service.

More generally stated, it is often desired that the permeability of plastics to water vapor be reduced to a minimum.

It is an object of this invention to provide plastic compositions having low water vapor permeability.

A particular object is to provide polystyrene based plastic compositions having low water vapor permeability while retaining the desirable physical properties of the parent plastic such as mechanical strength and adaptability to heat sealing.

Other objects and advantages will more fully appear in the following specification.

It has been discovered that if certain resins which act as solvents for a base plastic and which soften at a lower temperature than the base plastic are mixed with the base plastic while both are in granular form and the combination molded, the added resin appears to plug the interstitial voids which normally tend to form during the cooling of an untreated base.

In particular, I have found that the water vapor permeability of polystyrene compositions may be reduced by the incorporation of a high aromatic solid resin produced by the condensation, with formaldehyde, of aromatic petroleum products composed primarily of mono- and dimethyl naphthalenes.

A suitable process for carrying out the formaldehyde condensation is disclosed in U.S. Patent 2,494,758.

The aldehyde condensation reactions are well known to the art and are described for example, in "The Chemistry of Synthetic Resins," by Carleton Ellis, 1935, Reinhold Publishing Company. Other processes for the reaction are disclosed in U.S. Patent 2,464,455 and 2,501,600.

Since the aromatic petroleum products employed in the reaction will vary from batch-to-batch and process variations may be introduced, it will be appreciated that the melting point of the resulting resin will likewise vary. It has been found that typical commercially available high aromatic solid resins comprising primarily mono- and dimethyl naphthalene-formaldehydes have melting points ranging from about 155° F. to 165° F.

The base polystyrene composition employed may be an unmodified type or may be one modified with a minor proportion of other synthetic resin polymers, compatible with the polystyrene.

Modified polystyrene base compositions may be prepared by copolymerizing the styrene monomer with another monomer or by mechanical blending of the polymers. Preferably the ratio of the modifying polymer to the polystyrene should not exceed 1 part to 4 parts of polystyrene.

The compositions of this invention may contain from 2 to 20 parts of the described high aromatic resin per 100 parts of total composition. The balance of the composition being polystyrene or the modified polystyrene base composition.

Example 1

900 grams of a copolymer of acrylonitrile and styrene (in a ratio of 1:4) sized to pass an 80 mesh screen and be retained by a 140 mesh screen were thoroughly mixed by tumbling for 10 hours with 100 grams of the above described high aromatic resin. The high aromatic resin was previously ground so that substantially all particles passed a 200 mesh screen.

The resulting composition was molded at 310° F. for 20 minutes under a force of 5000 pounds to give disc shaped samples 2½ inches in diameter and about 0.030 inch thick. Upon comparison with a similarly molded sample of the copolymer not containing the high aromatic resin, it was found that inclusion of the high aromatic resin reduced the transmission of water vapor by 60%. The samples were tested by the well known cup method described, for instance, in "Elastomers and Plastomers," R. Houwink, volume 1, p. 321, Elseiver Publishing Co., New York, New York, 1950.

If desired, the two materials may be mixed on a roll mill or may be mixed, extruded, and chopped to form a convenient molding compound.

Example 2

The procedure of Example 1 was repeated using a mechanical blend of 10% polybutadiene and 90% polystyrene in place of the copolymer of Example 1. The resulting product had a water vapor transmission rate of 68% of the rate of a control molding made of the same polybutadiene-polystyrene blend but which did not have the high aromatic resin incorporated.

Example 3

Example 1 was repeated using unmodified polystyrene molding granules in place of the copolymer. The resultant molding containing the high aromatic resin had a water vapor transmission rate of 73% of the rate of a similarly prepared control specimen employing the same unmodified polystyrene without the high aromatic resin.

What is claimed is:

1. A molding composition from which articles characterized by a low vapor permeability may be produced by molding, comprising material selected from the group consisting of polystyrene, copolymers of acrylonitrile and styrene, and mechanical blends of polybutadiene and polystyrene; and containing between 2% and 20% by weight of the composition of a resinous condensation product resulting from the condensation of formaldehyde and an aromatic petroleum stock composed primarily of a naphthalene selected from the group consisting of monomethylnaphthalene and dimethylnaphthalene.

2. A molding composition from which articles characterized by a low vapor permeability may be produced by molding, comprising material selected from the group consisting of polystyrene, copolymers of acrylonitrile and styrene, and mechanical blends of polybutadiene and polystyrene; and containing between 2% and 20% by weight of the composition of a resinous condensation product resulting from the condensation of formaldehyde and an aromatic petroleum stock composed primarily of a naphthalene selected from the group consisting of monomethylnaphthalene and dimethylnaphthalene, said condensation product having a melting point between about 155° F. and 165° F.

3. A method of diminishing the susceptibility of a molded polystyrene based composition to penetration by vapor which comprises incorporating in said polystyrene base material at least one additive selected from the group consisting of monomethylnaphthalene condensed with formaldehyde and dimethylnaphthalene condensed with formaldehyde, in an amount of between about 2% and 20% by weight, based on the weight of the composition, and thereafter molding the composition under heat and pressure.

4. A method of diminishing the susceptibility of a molded polystyrene based composition to penetration by vapor which comprises incorporating in said polystyrene base material, at least one additive selected from the group consisting of monomethylnaphthalene condensed with formaldehyde and dimethylnaphthalene condensed with formaldehyde, said additive having a melting point between about 155° F. and 165° F. and being present in the amount of between 2% and 20% by weight of the composition; and thereafter molding the composition under heat and pressure.

No references cited.